(12) United States Patent
Pullagurla et al.

(10) Patent No.: US 10,927,258 B2
(45) Date of Patent: Feb. 23, 2021

(54) PROCESS FOR THE PREPARATION OF INDIGOTINDISULFONATE SODIUM (INDIGO CARMINE)

(71) Applicant: BIOPHORE INDIA PHARMACEUTICALS PVT. LTD., Hyderabad (IN)

(72) Inventors: Manik Reddy Pullagurla, Hyderabad (IN); Jagadeesh Babu Rangisetty, Hyderabad (IN)

(73) Assignee: BIOPHORE INDIA PHARMACEUTICALS PVT. LTD., Hyderabad (IN)

(*) Notice: Subject to any disclaimer, the term of this patent is extended or adjusted under 35 U.S.C. 154(b) by 0 days.

(21) Appl. No.: 16/471,999

(22) PCT Filed: Dec. 23, 2017

(86) PCT No.: PCT/IN2017/050615
§ 371 (c)(1),
(2) Date: Jun. 20, 2019

(87) PCT Pub. No.: WO2018/116325
PCT Pub. Date: Jun. 28, 2018

(65) Prior Publication Data
US 2020/0017689 A1  Jan. 16, 2020

(30) Foreign Application Priority Data
Dec. 23, 2016  (IN) .............................. 201641044154

(51) Int. Cl.
C09B 7/02 (2006.01)
C09B 67/48 (2006.01)

(52) U.S. Cl.
CPC ............ *C09B 7/02* (2013.01); *C09B 67/0025* (2013.01)

(58) Field of Classification Search
CPC ...................................................... C09B 7/02
See application file for complete search history.

(56) References Cited

FOREIGN PATENT DOCUMENTS

| JP | 2012188518 A | 10/2012 |
|---|---|---|
| RU | 1793717 C | 1/1996 |
| WO | 2011026109 A1 | 3/2011 |

OTHER PUBLICATIONS

Leclerc, et al. The Journal of Biological Chemistry, 276, 2001, pp. 251-260.*
International Search Report for Serial No. PCT/IN2017/050615 dated Feb. 22, 2018.

* cited by examiner

*Primary Examiner* — Shawquia Jackson
(74) *Attorney, Agent, or Firm* — McCormick, Paulding & Huber PLLC

(57) ABSTRACT

This invention relates to an improved method for the preparation of highly or substantially pure Indigotindisulfonate sodium (1). It further relates to the novel crystalline form I of Indigotindisulfonate sodium (1) and the process for its preparation.

7 Claims, 3 Drawing Sheets

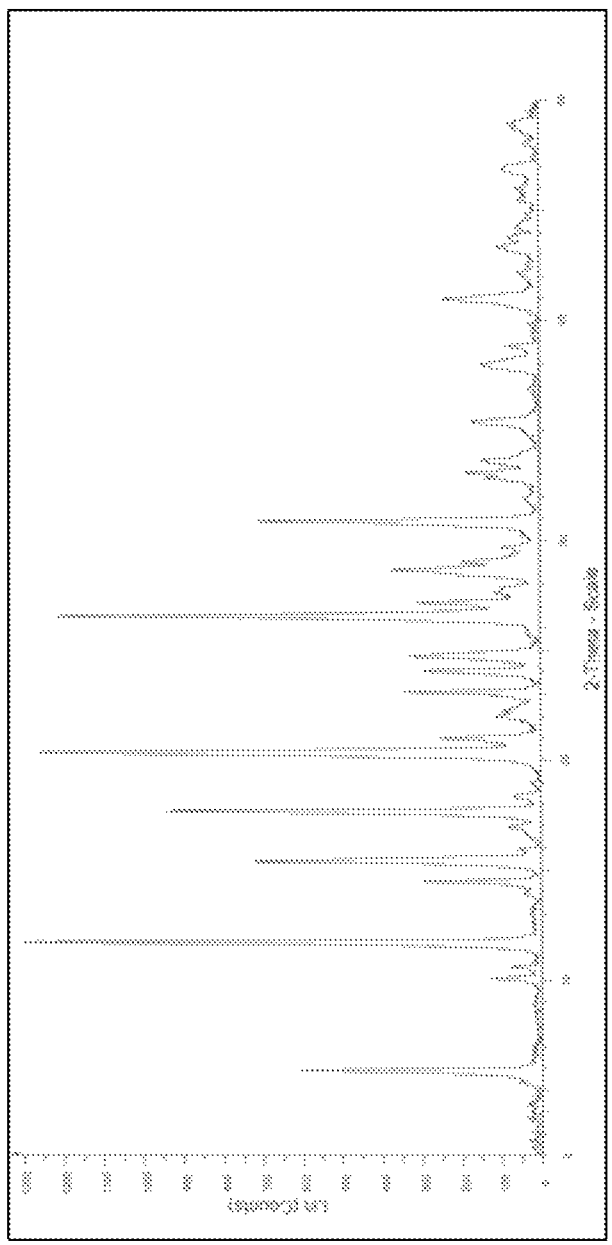
Figure 1: X-Ray diffractogram of Indigotindisulfonate sodium (1)

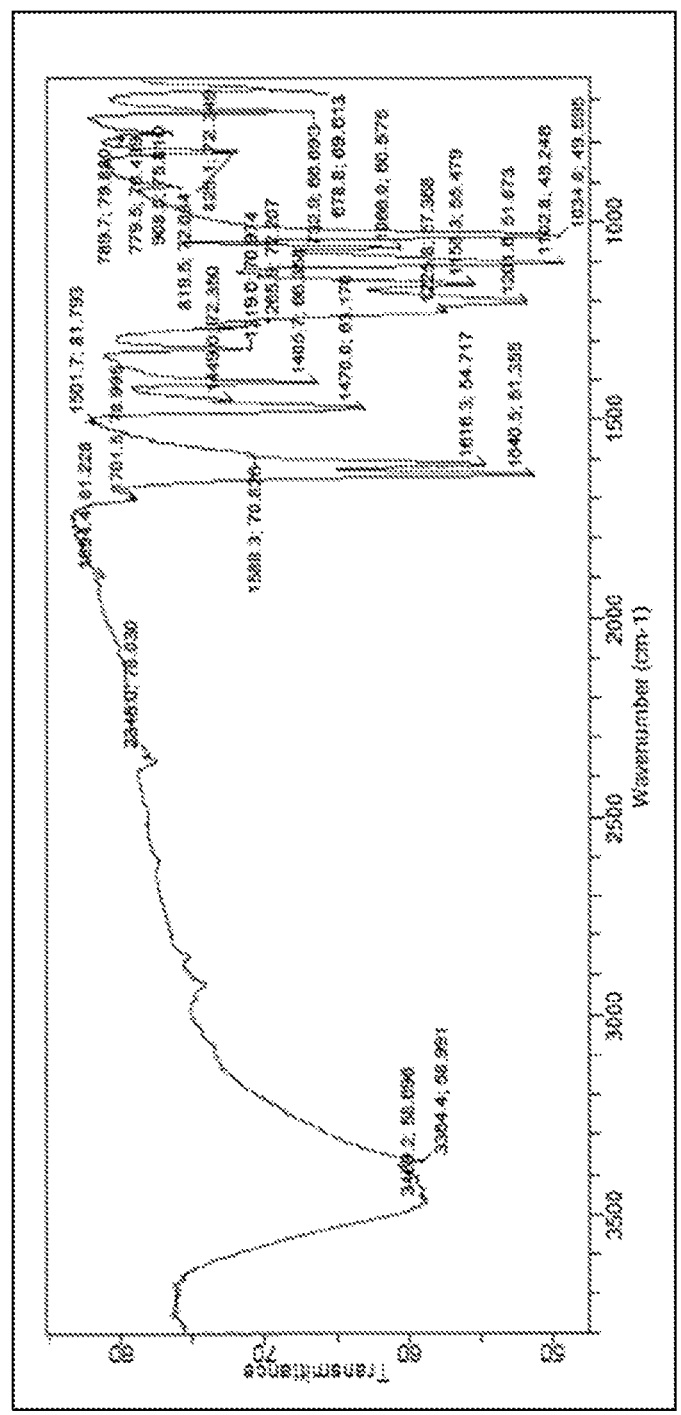
Figure 2: IR spectra of Indigotindisulfonate sodium (1)

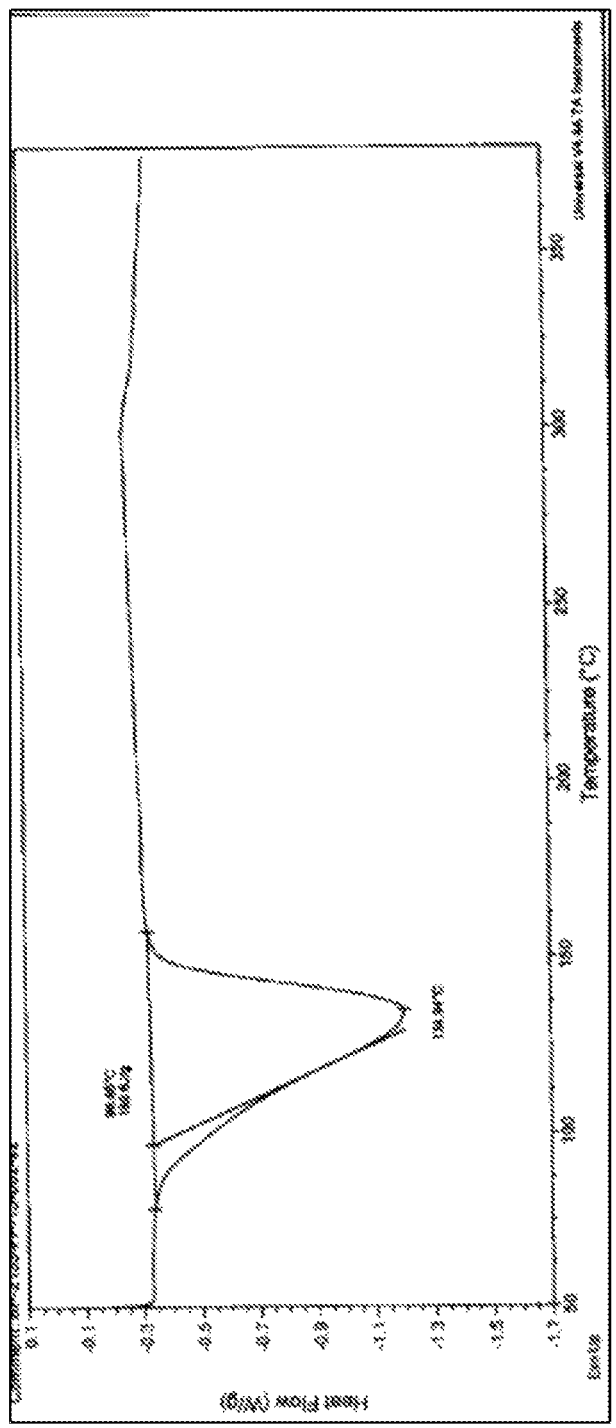
Figure 3: DSC thermogram of Indigotindisulfonate sodi

PROCESS FOR THE PREPARATION OF INDIGOTINDISULFONATE SODIUM (INDIGO CARMINE)

CROSS-REFERENCE TO RELATED APPLICATIONS

This application is a National Stage application of International Patent Application No. PCT/IN2017/050615, filed on Dec. 23, 2017, which claims priority to Indian Patent Application No. 201641044154, filed on Dec. 23, 2016, each of which is hereby incorporated by reference in its entirety.

TECHNICAL FIELD

The present invention relates to an improved process for the preparation of Indigotindisulfonate sodium (1). It further relates to novel crystalline form I of Indigotindisulfonate sodium (1) and process for its preparation.

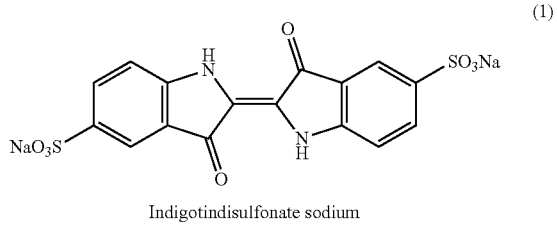

Indigotindisulfonate sodium (1)

BACKGROUND

Indigotindisulfonate sodium (1) is chemically referred to as disodium 3,3'-dioxo-2,2'-bi-indolylidene-5,5'-disulfonate.

German patent DE201108, describes the synthesis of Indigotindisulfonate sodium by converting 3-(2-nitrophenyl)-2-oxopropanoic acid to (E)-[2,2'-biindolinylidene]-3,3'-dione followed by reaction with sulphuric acid to provide Indigotindisulfonate sodium (1). There is no information about the purity and yield of the product.

SUMMARY

One object of the invention is to provide purification process for preparing substantially pure Indigotindisulfonate sodium having purity greater than 99%, preferably greater than 99.5% and total impurities less than 1.0% and preferably less than 0.5%.

Yet other object of the invention is to provide an improved process for preparing crystalline form I of Indigotindisulfonate sodium containing 4-7% of moisture content.

Another object of the invention is to provide purification process to remove the process impurities which include disodium 3,3'-dioxo-[delta2,2'-biindoline]-5,7'-disulfonate of impurity A, monosodium 3,3'-dioxo-[delta 2,2'-biindoline]-5 sulfonate of impurity B and sodium 2,3-dioxoindoline-5-sulfonate of impurity C.

Another object of the invention is to provide a process for preparing substantially pure Indigotindisulfonate sodium (1) which is having total impurity level less than 1.0%; preferably less than 0.5% and impurity A level less than 0.15%, Impurity B level less than 0.15%, impurity C level less than 0.15% and any unknown impurity is controlled below 0.10%.

Accordingly, it is an object of the present invention to provide an improved process for the preparation of Indigotindisulfonate sodium (1)

The present invention for the preparation of Indigotindisulfonate sodium (1) comprises of the following steps:

1) First step involves the conversion of 2-nitrobenzaldehyde of compound (2) to 2,2'-biindolylidene-3,3'-dione of compound (3) in the presence of a base 2) The second step involves sulphonation of 2,2'-biindolylidene-3,3'-dione of compound (3) to form 3,3'-dioxo-[62,2'-biindoline]-5,5'-disulfonic acid in situ. The intermediate so formed was diluted with a mixture of suitable protic and aprotic solvents and treated with a suitable sodium salt to yield crude (Indigotindisulfonate sodium 1), 3) The final step involves the purification of the obtained Indigotindisulfonate sodium (1) to isolate a crystalline compound (1)

According to this invention, there is provided a simple procedure for the purification of Indigotindisulfonate sodium (1) by avoiding distillation and other techniques using high temperatures.

Indigotindisulfonate sodium (1) obtained in the above procedure is having purity greater than 99% (by HPLC) and is devoid of the reaction impurities A, B and C, preferably greater than 99.5% and total impurities less than 1.0% and preferably less than 0.5%.

Another object of the invention is to provide Indigotindisulfonate sodium (1) with elemental purity i.e. lead level less than 0.5 ppm and Arsenic level less than 1.5 ppm, preferably combination of lead and arsenic is less than 2 ppm.

BRIEF DESCRIPTION OF THE DRAWINGS

FIG. 1: illustrates the X-Ray powder diffraction pattern (XRPD) of Indigotindisulfonate sodium (1)

FIG. 2: illustrates the infrared (IR) spectrum of Indigotindisulfonate sodium (1)

FIG. 3: illustrates the differential scanning calorimetry (DSC) of Indigotindisulfonate sodium (1)

DETAILED DESCRIPTION

The present invention relates to an improved process for the preparation of Indigotindisulfonate sodium (1) in substantially pure form.

Another object of the invention relates to the process for the preparation of substantially pure form of Indigotindisulfonate sodium (1) with purity greater than 99%, preferably greater than 99.5%.

The detailed process involves:

a) Treating 2-nitrobenzaldehyde of compound (2) with suitable base to obtain 2,2'-biindolylidene-3,3'-dione of compound (3). The unknown impurities observed in the reaction product at this stage are optionally removed by purification.

2-Nitro benzaldehyde

Compound 2

Compound 3

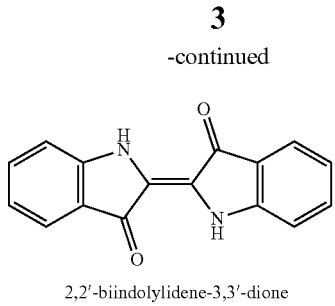

2,2'-biindolylidene-3,3'-dione b) Converting 2,2'-biindolylidene-3,3'-dion of compound (3) in to Indigotindisulfonate sodium of compound (1) by treating with sulphuric acid in the absence of solvent at temperature ranging from 20 to 35° C. followed by treatment with suitable base. The compound 1 is isolated by adjusting pH to not less than 13.

Compound 1

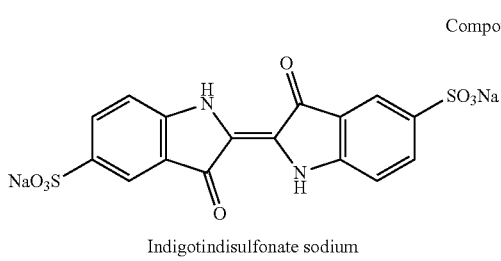

Indigotindisulfonate sodium c) Purifying the crude Indigotindisulfonate sodium of compound (1) obtained above by recrystallizing from suitable solvents to provide pure Indigotindisulfonate sodium (1)

Wherein, in step a) suitable base is selected from the group comprising sodium hydroxide, sodium carbonate, sodium bicarbonate or the like; solvent is selected from acetone, DM water or mixtures thereof. For removal of impurities solvents are selected from acetone, methanol and Dimethylformamide or mixtures thereof.

In step b) sulphuric acid is used as the reagent; solvents used for the quenching of the reaction mass are methanol, methyl-t-butyl ether and ethyl acetate.

In step c) Indigotindisulfonate sodium is further purified from the solvents selected from group comprising alcohols like methanol, ethanol, isopropyl alcohol, n-butanol; water; acetonitrile; tetrahydrofuran; acetone; ethyl acetate; dichloromethane or mixtures thereof.

In one aspect, the present invention provides a purification process to produce substantially pure Indigotindisulfonate sodium (1) devoid of the below impurities A, B and C by HPLC analysis.

Impurity A

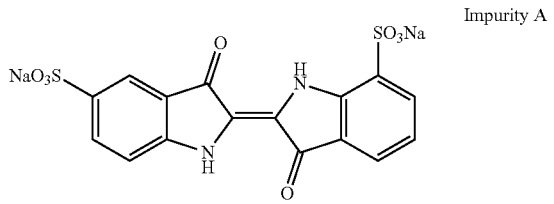

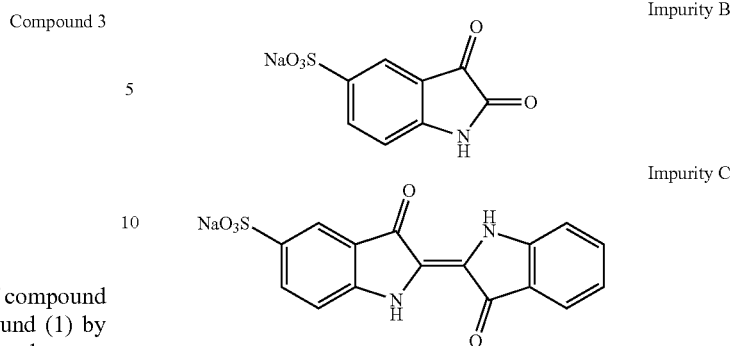

Impurity B

Impurity C

The purification process comprises the following steps:
i) Suspending crude Indigotindisulfonate sodium obtained in step-b in suitable solvents selected from a group comprising of protic or aprotic solvents or the mixtures thereof.
ii) Heating the suspension to 60-65° C.
iii) Cooling the suspension to 20-25° C.
iv) Filtering the suspension and washing with a suitable protic solvent at 20-25° C. to isolate crystalline form I of Indigotindisulfonate sodium (1)
v) Optionally repeating the above process with mixture of solvents to increase the purity of Indigotindisulfonate sodium (1)

Wherein the protic or aprotic solvents used in the above purification process are selected from the group consisting of water, methanol, ethanol, isopropyl alcohol, n-butanol, acetonitrile, tetrahydrofuran, acetone, ethyl acetate, dichloromethane or mixtures thereof.

Most preferable solvents used in the above purification process were selected from a group comprising of water, methanol and acetone or mixtures thereof; the ratio of solvent mixture preferably used ranged from (methanol 7: DM water 5: acetone 3) and (methanol 3.5: DM water 2.5: acetone 1.5)

The present invention facilitates the easy removal of many undesired impurities and maintains the pH of the product between 3.0 to 6.5 by providing high purity Indigotindisulfonate sodium (1).

Indigotindisulfonate sodium (1) obtained by the above purification is having moisture content 4-7% as measured by Karl Fischer analysis Indigotindisulfonate sodium (1) obtained by the purification process of the present invention is substantially pure and has purity greater than 99%, preferably greater than 99.5% and total impurities less than 1.0% and preferably less than 0.5%.

Indigotindisulfonate sodium (1) obtained by the purification process of the present invention is substantially pure and has purity greater than 99%, preferably greater than 99.5% measured by HPLC and which comprises Lead less than 0.5 ppm and Arsenic less than 1.5 ppm, which forms another object of the invention.

Indigotindisulfonate sodium (1) obtained by the purification process of the present invention is comprising total impurities less than 1.0% and preferably less than 0.5%, measured by HPLC and combination of lead and Arsenic metals less than 2 ppm.

In addition, Indigotindisulfonate sodium salt (1) synthesized according to the present invention is having metal impurities as shown in table-2 and forms yet another object of the invention.

The crystalline form I of Indigotindisulfonate sodium (1) obtained after purification is characterized by the X-Ray powder diffraction (XRPD) pattern as shown in FIG. 1 and table 1, infrared (IR) spectrum as shown in FIG. 2 and the differential scanning calorimetry (DSC) as shown in FIG. 3

TABLE 1

X-Ray diffraction data of Indigotindisulfonate sodium (1)

| S. no | 2 Theta ° C. | Relative intensity $I/I_0$ % |
|---|---|---|
| 1. | 5.801 | 46.5 |
| 2. | 10.03 | 9.4 |
| 3. | 10.55 | 5.8 |
| 4. | 11.67 | 100 |
| 5. | 14.4 | 22.9 |
| 6. | 15.37 | 55.7 |
| 7. | 16.92 | 6.1 |
| 8. | 17.62 | 72.3 |
| 9. | 18.33 | 5.3 |
| 10. | 20.31 | 97.1 |
| 11. | 20.97 | 19.2 |
| 12. | 21.96 | 8.5 |
| 13. | 23.07 | 8.5 |
| 14. | 24.03 | 22.6 |
| 15. | 24.72 | 25.1 |
| 16. | 26.54 | 93.7 |
| 17. | 27.16 | 23.6 |
| 18. | 27.62 | 8.6 |
| 19. | 27.80 | 6.9 |
| 20. | 28.65 | 28.5 |
| 21. | 29.01 | 15.1 |
| 22. | 29.66 | 7.3 |
| 23. | 30.87 | 54.6 |
| 24. | 32.83 | 10 |
| 25. | 33.06 | 14.2 |
| 26. | 33.62 | 10.6 |
| 27. | 35.39 | 12.8 |
| 28. | 37.99 | 11.6 |
| 29. | 38.8 | 6.2 |
| 30. | 40.97 | 18.7 |
| 31. | 43.36 | 8.4 |
| 32. | 43.77 | 5.9 |
| 33. | 46.93 | 6.9 |
| 34. | 48.76 | 5.3 |
| 35. | 48.99 | 5.8 |

TABLE 2

| S. No. | Element | Elemental results of Indigo carmine (ppm) | ICH safety limit (ppm) |
|---|---|---|---|
| 1. | Cadmium | 0.001 | 0.2 |
| 2. | Mercury | Not Detected | 0.3 |
| 3. | Cobalt | 0.041 | 0.5 |
| 4. | Vanadium | 0.075 | 1 |
| 5. | Nickel | 2.038 | 5 |
| 6. | Thallium | Not Detected | 0.8 |
| 7. | Gold | 0.000 | 10 |
| 8. | Palladium | 0.002 | 1 |
| 9. | Iridium | Not Detected | 1 |
| 10. | Osmium | 0.001 | 1 |
| 11. | Rhodium | Not Detected | 1 |
| 12. | Ruthenium | Not Detected | 1 |
| 13. | Selenium | Not Detected | 8 |
| 14. | Silver | Not Detected | 1 |
| 15. | Platinum | Not Detected | 1 |
| 16. | Lithium | Not Detected | 25 |
| 17. | Antimony | 0.001 | 9 |
| 18. | Barium | Not Detected | 70 |
| 19. | Molybdenum | 0.454 | 150 |
| 20. | Copper | 0.101 | 30 |
| 21. | Tin | Not Detected | 60 |
| 22. | Chromium | 13.133 | 110 |

The following examples further illustrate the present invention, but should not be construed in any way as to limit its scope.

EXAMPLES

Example-1

Preparation of 2,2'-biindolylidene-3,3'-dione (Compound 3)

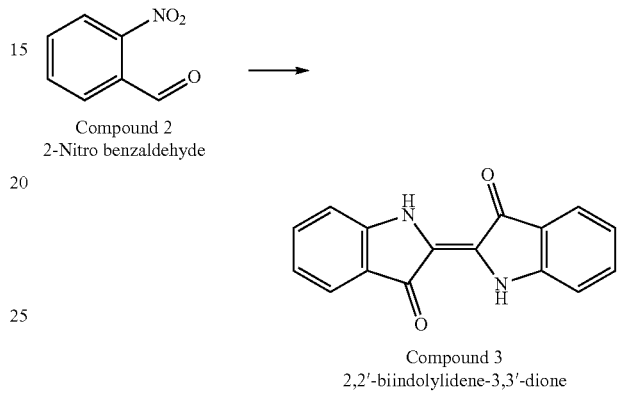

Compound 2
2-Nitro benzaldehyde

Compound 3
2,2'-biindolylidene-3,3'-dione

To a clean and dry RB flask, 1000 mL of acetone, 500 mL of DM water and 100 g of 2-nitrobenzaldehyde were charged and cooled to 0-5° C. To this 500 mL (1M) of aqueous sodium hydroxide solution was added at 0-5° C. and the reaction mass was stirred for 3-4 hrs at 25-30° C. After completion of the reaction, the reaction mass was filtered under vacuum and the solid obtained was washed with 500 mL of DM water and 200 mL of methanol. The intermediate 2,2'-biindolylidene-3,3'-dione (Compound 3) obtained in this contains more than 3% of unknown impurities.

Purification Process to Remove Unknown Impurities:

The obtained solid was heated in a mixture of 700 mL acetone and 300 mL methanol for 4-5 hrs at 55-60° C. Then the reaction mixture was cooled to 25-30° C. and filtered under vacuum. The obtained solid was filtered and washed with a mixture of acetone and methanol (1:1). The solid was heated in a mixture of 700 mL of acetone and 300 mL of methanol for 4-5 hrs at 55-60° C. Then the reaction mixture was cooled to 25-30° C. and filtered the solid under vacuum.

The solid so obtained was stirred in 1000 mL of methanol for 1-2 hrs at 25-30° C. and filtered under vacuum at 25-30° C. Further the solid was washed with 100 mL of methanol and dried for 8-10 hrs at 60-65° C. To this, 10 volumes of dimethyl formamide was added and stirred for 1 hr at 100-110° C. The mixture was then cooled to 50-55° C., filtered and washed the solid with 2 volumes of methanol and 1 volume of acetone. The solid so obtained was dried under vacuum at 60-65° C.

Yield: 18-21%
Purity: 96% (HPLC)
Chromatographic Conditions:
Column: Inertsil ODS 3V, 4.6×250 mm, 5μ
Wavelength: 285 nm
Flow Rate: 1.0 mL/min
Column Temp.: 25° C.
Injection volume: 20 μL
Run time: 55 min Flow mode: Gradient

Example-2

Preparation of Indigotindisulfonate Sodium (Crude Compound 1)

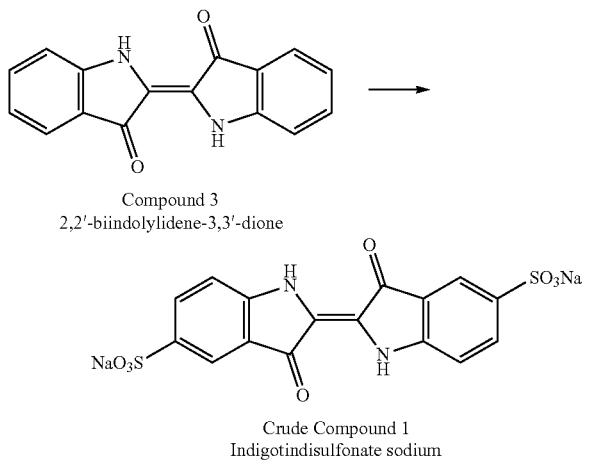

Compound 3
2,2'-biindolylidene-3,3'-dione

Crude Compound 1
Indigotindisulfonate sodium

To a clean and dry round bottom flask, 1500 mL of sulphuric acid and 100 g of 2,2'-biindolylidene-3,3'-dione (Compound 3) were charged. Then the reaction mixture was stirred for 1 hr at 25-30° C. After completion of reaction, the reaction mixture was quenched/diluted with pre-cooled mixture of methanol (54 volumes), methyl-t-butyl ether (34 volumes) and ethyl acetate (2 volumes) solvents at 5-10° C. The reaction mixture was stirred for 30 minutes and filtered under vacuum at 5-10° C. The obtained solid was washed with 500 mL of chilled methanol and suck dried for 2-3 hrs. 1000 mL of DM water was added to the solid and passed through micron filter, to the filtrate 1000 mL of methanol was charged and cooled to 5-10° C. Then the pH of the solution was adjusted to not less than 13 using aqueous sodium hydroxide solution. The precipitated solid was filtered and washed with 500 mL of chilled methanol at 5-10° C. to obtain crude Indigotindisulfonate sodium of compound (1) (pH: NLT 13)
Yield: 60%
Purity: 95-98%

Example-3

Purification of Indigotindisulfonate Sodium (Compound 1)

i) The crude Indigotindisulfonate sodium solid compound (1) obtained in example 2 was taken in a round bottom flask and charged 7 volumes of methanol, 5 volumes of DM water (Demineralized water) and 3 volumes of acetone. The reaction mixture was heated for 4-5 hrs at 60-65° C., cooled and stirred for 1-2 hrs at 20-25° C. The obtained solid was filtered and washed with 1 volume of methanol then suck dried for 2-3 hrs.

ii) Optionally, the solid obtained in step i) was heated in a mixture of 3.5 volumes methanol, 2.5 volumes of DM water and 1.5 volumes of acetone for 4-5 hrs at 60-65° C. Then the mixture was cooled to 20-25° C. and stirred for 1-2 hrs. The solid was filtered and washed with 1 volume of methanol then suck dried for 2-3 hrs.

iii) Again, the obtained solid in step ii), optionally was taken in a mixture of 3 volumes of DM water and 1.5 volumes of methanol at 25-30° C. The reaction mixture was heated for 4-5 hrs at 60-65° C., cooled and stirred for 1-2 hrs at 20-25° C. The product was filtered and washed with methanol then suck dried under vacuum for 1-2 hrs.

iv) Optionally, the solid obtained in step i), ii) or iii) was taken in 1.5 volumes of DM water and stirred for 8-10 hrs at 25-30° C., to this 0.5 volume of methanol was added and stirred for 1-2 hrs. Then the solid was filtered and suck dried under vacuum for 1-2 hrs. Then the final solid was dried under vacuum at 65-70° C. until LOD complies.

(Yield: 28-32%, Purity by HPLC: 99.9%, Assay: 99%, pH: 3-6.5)

v) Optionally, the solid obtained in step i), ii) or iii) was dissolved in 2 volumes of DM water at 25-30° C., and stirred for 8-10 hrs. 1 volume of methanol was then added and stirred for 1-2 hrs at 20-25° C. The solid so formed was filtered and washed with 0.5 volume of methanol and dried for 10-12 hrs at 65-70° C. until LOD and pH complies. If the LOD and the pH is not in the limit, then the material was stirred in 3 volumes of water and 1 volume of methanol for 1-2 hrs at 25-30° C. The solid so obtained was washed with methanol, dried under vacuum. (pH: 3-6.5, LOD: NMT 5.0%)

Yield: 28-32%
Purity by HPLC: 99.9%
Assay: 99.0%
Arsenic: 0.01 ppm
Lead: 0.02 ppm Chromatographic Conditions:
A High-Performance Liquid Chromatography equipped with Ultraviolet Spectrophotometer as detector and an auto sampler.
Column: Inertsil ODS 3V (4.6×250 mm, 5μ)
Wave length: 245 nm
Flow Rate: 1.0 mL/min
Injection volume: 10 μL
Run time: 60 min
Column temperature: Ambient
Flow mode: Gradient
Diluent: Water While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. An improved process for the preparation of Indigotindisulfonate sodium having purity greater than 99.0% comprising the steps of:

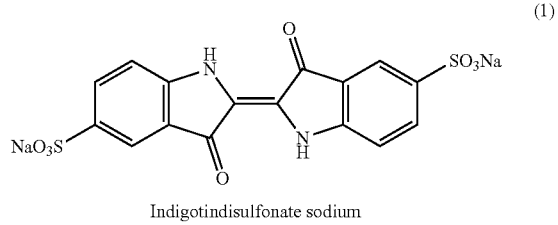

(1)

Indigotindisulfonate sodium i. treating a 2-nitrobenzaldehyde (2)

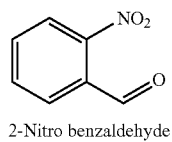

2-Nitro benzaldehyde with base to give a 2,2'-biindolylidene-3,3'-dione (3);

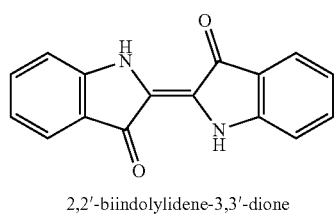

2,2'-biindolylidene-3,3'-dione ii. sulphonating the 2,2'-biindolylidene-3,3'-dione (3) by treating with concentrated sulphuric acid followed by pH adjustment with sodium hydroxide to obtain crude Indigotindisulfonate sodium (1); and iii. purifying the crude Indigotindisulfonate sodium (1) to give pure Indigotindisulfonate sodium (1), wherein the purification process comprises:
  a. suspending crude Indigotindisulfonate sodium (1) in protic or aprotic solvent;
  b. heating the suspension to 60-65° C.;
  c. cooling the suspension to 20-25° C.; and
  d. filtering the suspension and washing with methanol at 20-25° C. to isolate pure crystalline Indigotindisulfonate sodium (1).

2. The process as claimed in claim 1, wherein the base used in step i) is selected from the group consisting of sodium hydroxide, sodium carbonate, sodium bicarbonate or the like.

3. The process as claimed in claim 1, wherein the pH in step ii) is maintained above 13 by using sodium hydroxide.

4. The process as claimed in claim 1, wherein the protic or aprotic solvent is selected from the group consisting of water, methanol, ethanol, isopropanol, n-butanol, acetonitrile, tetrahydrofuran, acetone, ethyl acetate, dichloromethane or mixtures thereof.

5. A process for the purification of Indigotindisulfonate sodium comprising:
  a. suspending crude Indigotindisulfonate sodium (1) in protic or aprotic solvent;
  b. heating the suspension to 60-65° C.;
  c. cooling the suspension to 20-25° C.; and
  d. filtering the suspension and washing with methanol at 20-25° C. to isolate pure crystalline Indigotindisulfonate sodium (1).

6. The process as claimed in claim 5, wherein the protic or aprotic solvent is selected from the group consisting of water, methanol, ethanol, isopropanol, n-butanol, acetonitrile, tetrahydrofuran, acetone, ethyl acetate, dichloromethane or mixtures thereof.

7. A crystalline form I of Indigotindisulfonate sodium wherein X-ray powder diffraction (XRPD) pattern as shown in FIG. 1 having peaks at 2 theta values 5.8, 11.67, 15.37, 17.62, 20.31 and 26.54±0.2°

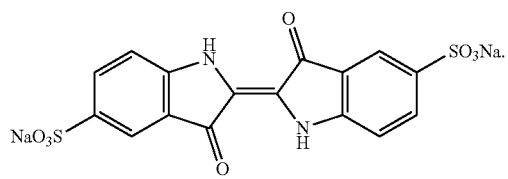

Indigotindisulfonate sodium

* * * * *